July 10, 1962
E. V. SUNDT
3,043,089
ELECTRIC CLOCK
Filed Aug. 3, 1959
2 Sheets-Sheet 1
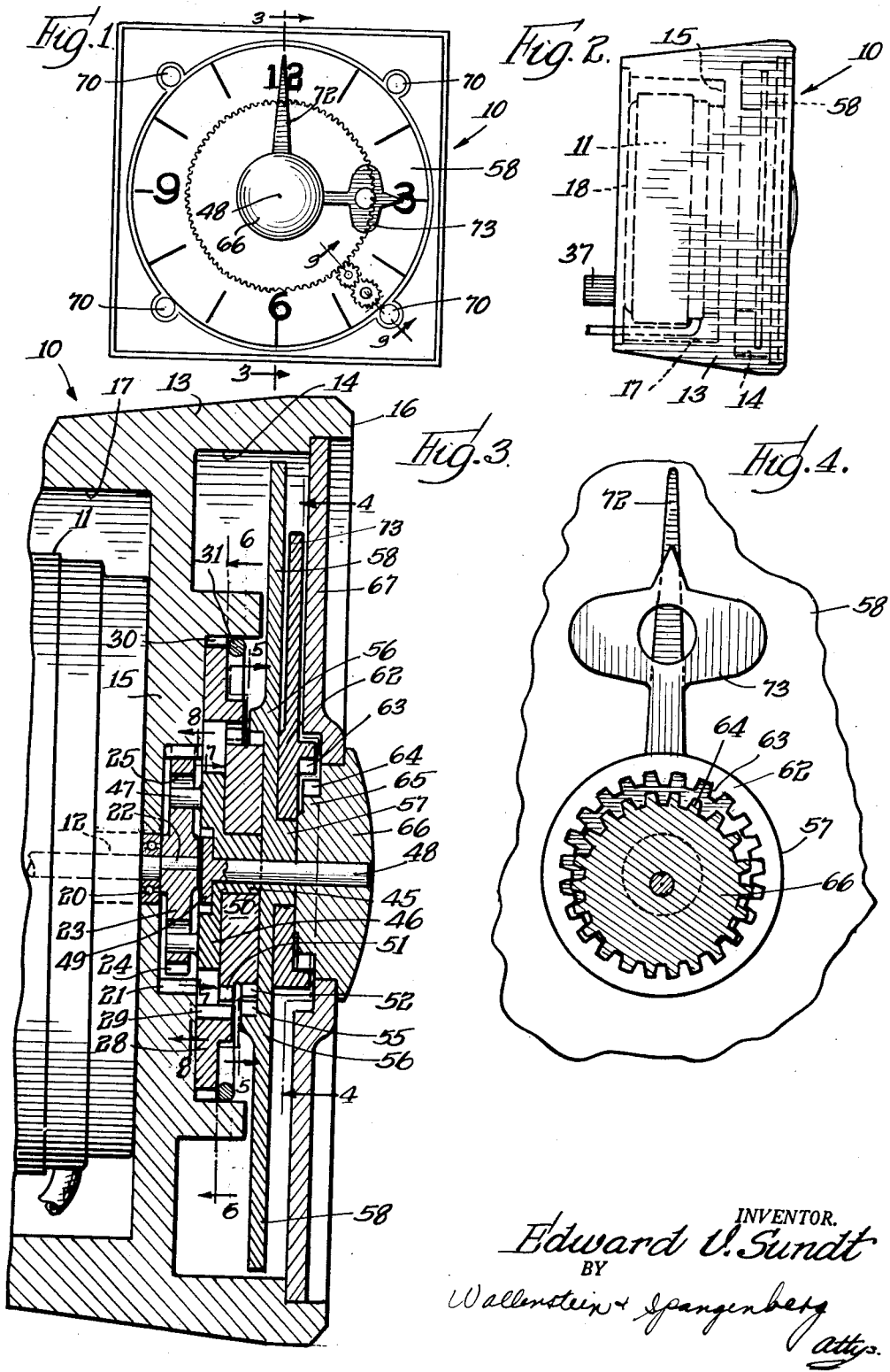
INVENTOR.
Edward V. Sundt
BY
Wallenstein + Spangenberg
attys.

July 10, 1962    E. V. SUNDT    3,043,089
ELECTRIC CLOCK
Filed Aug. 3, 1959    2 Sheets-Sheet 2
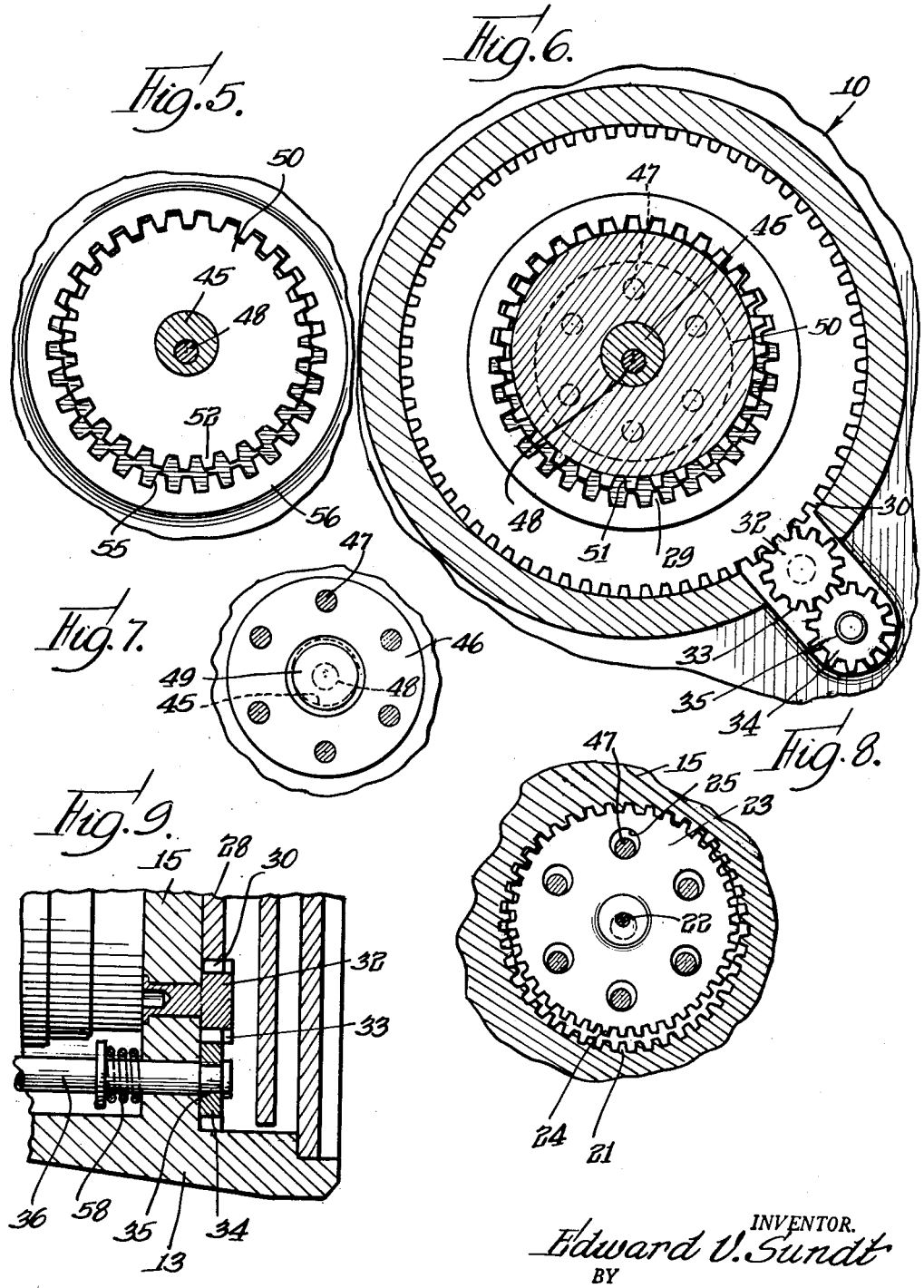
INVENTOR.
Edward V. Sundt
BY
Wallenstein & Spangenberg
Attys.

United States Patent Office 3,043,089
Patented July 10, 1962

3,043,089
ELECTRIC CLOCK
Edward V. Sundt, 118 Sterling Lane, Wilmette, Ill.
Filed Aug. 3, 1959, Ser. No. 831,239
14 Claims. (Cl. 58—26)

The principal object of this invention is to provide an improved electric clock, wherein a synchronous electric motor operates through differential gear reducer means for moving the time indicating hands, wherein the parts are all concentrically arranged about a central axis to provide a compact arrangement, wherein a minimum number of parts are utilized to provide a simple, rugged and inexpensive arrangement, and wherein the electric clock includes two separate assemblies which may be separately checked and inspected prior to final assembly and checking to further reduce manufacturing costs.

Briefly, the electric clock of this invention includes a synchronous electric motor rotating its shaft at a synchronous speed. A hollow housing is secured to the electric motor concentrically with the motor shaft with the motor shaft extending into the hollow housing from one end thereof and the other end of the housing being open. A first assembly is arranged within the hollow housing and it includes a first differenetial gear reducer, concentric with the motor shaft, comprising a first toothed annulus formed in the housing concentrically with the motor shaft, an eccentric on the motor shaft, and a first toothed rotor or output member rotatably mounted on the eccentric and meshing with the first toothed annulus. It also includes a second toothed annulus carried within the hollow housing. The hollow housing may also be provided with a hollow extension for receiving the motor so that the housing acts as a complete clock case.

The second assembly includes a cover member for the open end of the housing and second and third differential gear reducers supported by the cover member concentrically with a central axis which is concentric with the motor shaft axis. The second differential gear reducer includes a second eccentric rotatably supported by the cover member, a second rotor rotatably mounted on the second eccentric and having a first ring of teeth adapted to mesh with the second toothed annulus and a second ring of teeth, and a gear member or output member rotatably supported by the cover member and meshing with the second ring of teeth on the second rotor. The third differential gear reducer includes a third eccentric carried by the gear member, a third toothed annulus carried by the cover member, and a third toothed rotor or output member rotatably mounted on the third eccentric and meshing with the third toothed annulus.

When the cover member of the second assembly is secured to the open end of the housing with the second and third differential gear reducers enclosed therein, the first ring of teeth on the second rotor mesh with the second toothed annulus, and a separable coupling means couples the second eccentric of the second differential gear reducer to the first toothed rotor or output member of the first differential gear reducer, the first and second assemblies being thus coupled together for operation.

Indicating means are operated by the gear member or output member of the second differential gear reducer for indicating time in minutes and indicating means are also operated by the third rotor or output member of the third differential gear reducer for indicating time in hours. In this connection, the cover member is transparent and is provided with time indicia, an indicating hand is directly carried by the gear member or output member of the second differential gear reducer for co-operating with the time indicia on the transparent cover member for indicating time in minutes, and an indicating hand is directly carried by the third rotor or output member of the third differential gear reducer for co-operating with the time indicia on the transparent cover member for indicating time in hours. This arrangement of time indicia also forms an important feature of this invention.

Manually operable means carried by the housing are provided for manually rotatably positioning the second toothed annulus for manually manipulating the second differential gear reducer and hence the third differential gear reducer for manually setting the time indications of the electric clock.

Further objects of this invention reside in the details of construction of the electric clock and in the cooperative relationships between the component parts thereof.

Other objects and advantages of this invention will become apparent to those skilled in the art upon reference to the accompanying specification, claims, and drawings in which:

FIG. 1 is a front elevational view of the electric clock of this invention;

FIG. 2 is a side elevational view looking from the left of FIG. 1;

FIG. 3 is a vertical sectional view through the electric clock taken substantially along the line 3—3 of FIG. 1;

FIG. 4 is a vertical sectional view taken substantially along the line 4—4 of FIG. 3;

FIG. 5 is a vertical sectional view taken substantially along the line 5—5 of FIG. 3;

FIG. 6 is a vertical sectional view taken substantially along the line 6—6 of FIG. 3;

FIG. 7 is a vertical sectional view taken substantially along the line 7—7 of FIG. 3;

FIG. 8 is a vertical sectional view taken substantially along the line 8—8 of FIG. 3; and FIG. 9 is a sectional view taken substantially along the line 9—9 of FIG. 1.

The electric clock of this invention in generally designated at 10 and it includes a synchronous electric motor 11 for operating a motor shaft 12 at a synchronous speed, the motor being a conventional motor having high-speed, low-torque characteristics and operating, for example, at a speed of 600 r.p.m. Suitably secured to the electric motor 11 is a housing 13 which is hollow as indicated at 14, which is provided at one end with a transverse wall 15 and which is open at its other end as indicated at 16. The housing 13 is also provided with a further hollow portion 17 for receiving the electric motor 11 and the motor may be enclosed within this hollow portion by a closure plate 18 suitably secured in place. The housing may be formed of any suitable material as, for example, a synthetic plastic material such as a glass filled phenolic material which may be readily and accurately molded. In mounting the housing 13 on the motor 11, a central opening in the wall 15 of the housing receives the external surface of the motor bearing 20 for the shaft 12 so that the housing 13 is accurately concentrically arranged with respect to the axis of rotation of the motor shaft. The wall 15 of the housing is provided with a first internal toothed annulus 21 which is accurately concentrically arranged with respect to the axis of rotation of the motor shaft 12 because of the aforementioned manner of mounting the housing on the motor 11.

The motor shaft 12 which extends into the hollow housing 13 is provided with an eccentric in the form of an eccentric pin 22 and rotatably mounted on this eccentric pin 22 is a first rotor 23 having external teeth 24 which mesh with the teeth 21 of the first internal toothed annulus. The rotor may be formed of any suitable material as, for example, a synthetic plastic such as glass filled nylon or the like. The number of teeth 24 on the rotor 23 is 40 teeth and the number of teeth 21 in the first internal toothed annulus is 41. As the eccentric 22 is rotated at 600 r.p.m., the rotor 23 is oscillated thereby and, because of the meshing of the teeth on the rotor and annulus, the rotor 23 is caused to rotate with a 40 to 1 speed reduction at 15 r.p.m. The rotor 23 is provided with a plurality of holes 25 which act as part of a coupling means for transmitting the rotary motion of the rotor 23.

A second internal toothed annulus 28 is rotatably mounted in the interior of the housing 13, this annulus having internal teeth 29. The annulus may be formed of any suitable material such as powdered iron or a suitable synthetic plastic material. The annulus is also provided with external teeth 30. The annulus 28 is secured in place by a spring retainer ring 31. The external teeth 30 on the annulus 28 mesh with teeth 33 on an idler gear 32 mounted for rotation in the wall 15 of the housing member 13, the idler teeth 33 in turn meshing with teeth 34 on a gear 35 carried by a setting shaft 36 also journalled for rotation in the wall 15 of the housing 13. The setting shaft 36 extends rearwardly past the electric motor 11 and through the closure plate 18 and is provided at its rearward end with a knurled knob 37 for manually rotating the same. A spring 38 presses the gear 35 against the housing 13 so as to provide a friction resistance to rotation thereof. As a result, the internal toothed annulus 28 is normally maintained stationary, but it may be rotatably positioned by manual manipulation of the knob 37. As will be pointed out later, the manual positioning of the internal annulus 28 is for the purpose of setting the time indications of the electric clock.

The foregoing parts form a first assembly which may be accurately checked and inspected following the assembly thereof without having to wait for final assembly before so doing. A second assembly includes a second eccentric 45 formed on a coupling member 46 having pins 47 which are adapted to be received in the holes 25 of the first rotor 23. The eccentric and coupling member 45, 46 is rotatably supported by a pin 48 having a head 49. The eccentric and coupling member 45, 46 may be formed of any suitable synthetic plastic material such as nylon or the like. A second rotor 50 is rotatably mounted on the second eccentric 45 and it is provided with a first ring of external teeth 51 which mesh with the ring of teeth 29 on the second internal annulus 28. The rotor 50 is also provided with a second ring of external teeth 52. The rotor 50 may be formed of any suitable material such as synthetic plastic, powdered iron or the like.

The second ring of teeth 52 on the rotor 50 meshes with internal teeth 54 on a gear member 56 which is rotatably mounted on the pin 48, the gear member 56 also having a third eccentric 57. The gear member 56 has a disc shaped extension 58 which is opaque and which substantially fills the hollow interior 14 of the housing 17 so as to hide from view everything behind it. This gear member 56 with its eccentric 57 and disc shaped extension 58 may be formed of any suitable material such as a synthetic plastic material as, for example, glass filled nylon. As the second eccentric 45 is rotated, the second rotor 50 is oscillated thereby and, due to the meshing of the teeth 29 and 51, the second rotor 50 is also caused to rotate. Also due to the meshing of the teeth 52 and 55, the gear member 56 is caused to rotate. The number of teeth 29 in the internal toothed annulus is (a) 31 teeth, the number of teeth 51 on the rotor 50 is (b) 30 teeth, the number of teeth 52 on the rotor 50 is (c) 29 teeth, and the number of teeth 55 on the gear member 56 is (d) 30 teeth.

The speed reduction ratio of this differential gear reducer is determined by the formula $$K = \frac{1}{\frac{ac}{bd}-1} = \frac{1}{\frac{31 \times 29}{30 \times 30}-1} = 900$$

Thus, with the electric motor operating the motor shaft 12 at 600 r.p.m., the eccentric 45 is rotated at 15 r.p.m. and the gear member 56 is rotated at 1 r.p.h. (one revolution per hour).

Rotatably mounted on the third eccentric 57 is a third rotor 62 having a ring of internal teeth 63 which meshes with a ring of external teeth 64 formed on an annulus 65 of a support member 66 having a central hole for supporting the central pin 48. The support member 66 is in turn secured to and supported by a transparent cover plate 67. The third rotor 62 may be formed of any suitable material such as glass filled nylon or the like, the support member 66 may be formed of any suitable material such as die-cast aluminum, powdered brass or the like, and the transparent cover plate 67 may be formed of any suitable material such as clear acrylic synthetic plastic or the like. The ring of teeth 64 on the annulus 65 is concentric with the axis of the pin 48. The number of teeth 63 on the rotor 62 is 24 teeth and the number of teeth 64 on the toothed annulus 65 is 22 teeth, these numbers of teeth operating to produce a speed reduction ratio of 12 to 1. Thus, as the eccentric 57 is rotated at 1 r.p.h., the rotor 62 is oscillated and is rotated at a speed of 1 r.p. 12 h. (one revolution every 12 hours).

The eccentric and coupling member 45, 46 and the gear member and eccentric 56, 57 are rotatably mounted on the pin 48 which in turn is secured in place in the supporting member 66 which in turn is carried by the cover plate 67. Thus, all of the parts forming the second differential gear reducer and the third differential gear reducer are carried by the cover plate 67 in a single assembly so that the same may be checked and inspected before final assembly of the electric clock. The cover plate 67 of the second assembly is received in the open end 16 of the housing 13 and is suitably held in place therein by screws 70 or the like. When the cover plate 67 is so secured in place, the second and third differential gear reducers are enclosed within the housing 13, the ring of teeth 51 of the second rotor 50 meshes with the teeth 29 of the internal toothed annulus 28, and the pins 47 on the coupling member 46 are received within the holes 25 in the first rotor 23 so as to produce a speed reduction drive from the shaft 12 of the electric motor to the gear member 56 and the rotor 62.

The disc extension 58 on the gear member 56 has a minute hand 72 formed thereon as by hot pressing a gold foil thereon. The third rotor 62 is provided with a hand extension 73 which forms the hour hand of the electric clock. The transparent cover plate 67 has time indicia formed thereon as shown in FIG. 1 which may be accomplished by engraving or by hot pressing gold leaf letters on the rear side thereof. The minute hand 72 formed on the disc extension 58 of the gear member 56 and the hour hand 73 formed on the third rotor 62 cooperate with the time indicia formed on the transparent cover plate 67 for indicating time in minutes and in hours. The disc shaped extension 58 on the gear member 56 forms an opaque background for the face of the electric clock. By reason of this clock face arrangement, the need for extensions through the clock face and for minute and hour hands operated by such extensions is entirely eliminated. Thus, an extremely unique and inexpensive construction with fewer parts is here provided for indicating the time.

In order to manually set the time indications of the electric clock, the knurled knob 37 is rotated to rotate the second toothed annulus 28 in the housing 13 and, when this occurs, the rotor 50 is manually turned about the eccentric 45, to manually turn the gear member 56 to the desired position as indicated by the minute hand 72. As the gear member 56 of the second differential gear reducer is thus manipulated, the rotor 62 and its hour hand 73 of the third differential gear reducer are also manually manipulated by the action of the third eccentric 57 for setting the hour hand 73 to the desired position.

While, for purposes of illustration, one form of the electric clock of this invention has been disclosed, other forms thereof may become apparent to those skilled in the art upon reference to this disclosure and, therefore, this invention should be limited only by the scope of the appended claims.

I claim as my invention:

1. An electric clock comprising a synchronous electric motor including a shaft directly driven by the motor at a synchronous speed, a hollow housing secured to the electric motor concentrically with the motor shaft with the motor shaft extending into the hollow housing from one end thereof and the other end of the housing being open, a first assembly in the hollow housing including a first differential gear reducer concentric with the motor shaft and driven thereby and having an output member, a second assembly including a closure member for the open end of the housing, a second differential gear reducer centrally supported by the closure member and having a second output member behind the closure member, and a third differential gear reducer driven by the second output member of the second differential gear reducer and supported by the closure member concentrically with the second differential gear reducer and having an output member behind the closure member, means for securing the closure member of the second assembly to the open end of the hollow housing with the second and third differential gear reducers enclosed therein, separable coupling means for coupling the second differential gear reducer to the output member of the first differential gear reducer to be driven thereby when the closure member is secured to the open end of the housing, said closure member being transparent and having time indicia thereon, said output member of the second differential gear reducer having an indicating hand thereon behind and visible through the transparent closure member and cooperating with the time indicia on the transparent closure member for indicating time in minutes, and said output member of the third differential gear reducer having an indicating hand thereon behind and visible through the transparent closure member and cooperating with the time indicia on the transparent closure member for indicating time in hours.

2. An electric clock comprising a synchronous electric motor including a shaft directly driven by the motor at a synchronous speed, a hollow housing secured to the electric motor concentrically with the motor shaft with the motor shaft extending into the hollow housing from one end thereof and the other end of the housing being open and having a toothed annulus concentric with the motor shaft, a first assembly including a first differential gear reducer having an eccentric on the motor shaft and a first toothed rotor rotatably mounted on the eccentric and meshing with the first toothed annulus, and a second toothed annulus carried by the housing concentric with the motor shaft, a second assembly including a closure member for the open end of the housing, a second differential gear reducer having a second eccentric rotatably supported by the closure member, a second rotor rotatably mounted on the second eccentric and having a first ring of teeth adapted to mesh with the second toothed annulus and a second ring of teeth, and a toothed gear member rotatably supported by the closure member concentrically with the axis of rotation of the second eccentric and meshing with the second ring of teeth on the second rotor, and a third differential gear reducer having a third eccentric carried by the toothed gear member, a third toothed rotor rotatably mounted on the third eccentric, and a third toothed annulus carried by the closure member concentrically with the axis of rotation of the third eccentric and meshing with the third toothed rotor, means for securing the closure member of the second assembly to the open end of the hollow housing with the second and third differential gear reducers enclosed therein and with the first ring of teeth on the second rotor meshing with the second toothed annulus, separable coupling means for coupling the second eccentric to the first toothed rotor when the closure member is secured to the open end of the housing, said closure member being transparent and having time indicia thereon, said toothed gear member of the second differential gear reducer having an indicating hand thereon behind and visible through the transparent closure member and cooperating with the time indicia on the transparent closure member for indicating time in minutes, and said third toothed rotor of the third differential gear reducer having an indicating hand thereon behind and visible through the transparent closure member and cooperating with the time indicia on the transparent closure member for indicating time in hours.

3. An electric clock comprising a synchronous electric motor including a shaft directly driven by the motor at a synchronous speed, a hollow housing secured to the electric motor concentrically with the motor shaft with the motor shaft extending into the hollow housing from one end thereof and the other end of the housing being open, a first assembly in the hollow housing including a first differential gear reducer concentric with the motor shaft and driven thereby and having an output member, a second assembly including a closure member for the open end of the housing, a second differential gear reducer centrally supported by the closure member and having a second output member behind the closure member, and a third differential gear reducer driven by the second output member of the second differential gear reducer and supported by the closure member concentrically with the second differential gear reducer and having an output member behind the closure member, means for securing the closure member of the second assembly to the open end of the hollow housing with the second and third differential gear reducers enclosed therein, separable coupling means for coupling the second differential gear reducer to the output member of the first differential gear reducer to be driven thereby when the closure member is secured to the open end of the housing, said closure member being transparent and having time indicia thereon, said output member of the second differential gear reducer having an indicating hand thereon behind and visible through the transparent closure member and cooperating with the time indicia on the transparent closure member for indicating time in minutes, and said output member of the third differential gear reducer having an indicating hand thereon behind and visible through the transparent closure member and cooperating with the time indicia on the transparent closure member for indicating time in hours, and means supported by the housing for manually manipulating the second differential gear reducer and hence the third differential gear reducer for manually setting the time indications of the electric clock.

4. An electric clock comprising a synchronous electric motor including a shaft directly driven by the motor at a synchronous speed, a hollow housing secured to the electric motor concentrically with the motor shaft with the motor shaft extending into the hollow housing from one end thereof and the other end of the housing being open and having a toothed annulus concentric with the motor shaft, a first assembly including a first differential gear reducer having an eccentric on the motor shaft and a first toothed rotor rotatably mounted on the eccentric and meshing with the first toothed annulus, and a second toothed annulus carried by the housing concentric with the motor shaft, a second assembly including a closure member for the open end of the housing, a second differential gear reducer having a second eccentric rotatably supported by the closure member, a second rotor rotatably mounted on the second eccentric and having a first ring of teeth adapted to mesh with the second toothed annulus and a second ring of teeth, and a toothed gear member rotatably supported by the closure member concentrically with the axis of rotation of the second eccentric and meshing with the second ring of teeth on the second rotor, and a third differential gear reducer having a third eccentric carried by the toothed gear member, a third toothed rotor rotatably mounted on the third eccentric, and a third toothed annulus caried by the closure member concentrically with the axis of rotation of the third eccentric and meshing with the third toothed rotor, means for securing the closure member of the second assembly to the open end of the hollow housing with the second and third differential gear reducers enclosed therein and with the first ring of teeth on the second rotor meshing with the second toothed annulus, separable coupling means for coupling the second eccentric to the first toothed rotor when the closure member is secured to the open end of the housing, said closure member being transparent and having time indicia thereon, said toothed gear member of the second differential gear reducer having an indicating hand thereon behind and visible through the transparent closure member and cooperating with the time indicia on the transparent closure member for indicating time in minutes, and said third toothed rotor of the third differential gear reducer having an indicating hand thereon behind and visible through the transparent closure member and cooperating with the time indicia on the transparent closure member for indicating time in hours, and means supported by the housing for manually rotatably positioning the second toothed annulus for manually manipulating the second differential gear reducer and hence the third differential gear reducer of manually setting the time indications of the electric clock.

5. In an electric clock, an assembly comprising a transparent cover member having time indicia thereon, a first differential gear reducer supported by the transparent cover member concentrically with a central axis and having an output member behind the transparent cover member, a second differential gear reducer supported by the transparent cover member concentrically with the central axis and driven by the output member of the first differential gear reducer and having an output member behind the transparent cover member, an indicating hand on the output member of the first differential gear reducer behind and visible through the transparent cover member and cooperating with the time indicia on the transparent cover member for indicating time in minutes, and an indicating hand on the output member of the second differential gear reducer behind and visible through the transparent cover member and cooperating with the time indicia on the transparent cover member for indicating time in hours.

6. In an electric clock, a hollow housing open at one end, an asesmbly comprising a transparent cover member secured to the open end of the hollow housing and having time indicia thereon, a first differential gear reducer in the housing and supported by the transparent cover member concentrically with a central axis and having an output member behind the transparent cover member, a second differential gear reducer in the housing and supported by the transparent cover member concntrically with the central axis and driven by the output member of the first differential reducer and having an output member behind the transparent cover member, an indicating hand on the output member of the first differential gear reducer behind and visible through the transparent cover member and cooperating with the time indicia on the transparent cover member for indicating time in minutes, and an indicating hand on the output member of the second differential gear reducer behind and visible through the transparent cover member and cooperating with the time indicia on the transparent cover member for indicating time in hours.

7. In an electric clock, an assembly comprising a transparent cover member having time indicia thereon, a first differential gear reducer supported by the transparent cover member concentrically with a central axis and having an output member behind the transparent cover member, a second differential gear reducer supported by the transparent cover member concentrically with the central axis and driven by the output member of the first differential gear reducer and having an output member behind the transparent cover member, said output member of the first differential gear reducer comprising an opaque disc of substantially the same diameter as the transparent cover member and having an indicating hand thereon behind and visible through the transparent cover member and cooperating with the time indicia on the transparent cover member for indicating time in minutes, and said output member of the second differential gear reducer being located between the transparent cover member and the output member of the first differential gear reducer and comprising a disc of less diameter than diameter of the output member of the first differential gear reducer and having an indicating hand thereon behind and visible through the transparent cover member and cooperating with the time indicia on the transparent cover member for indicating time in hours.

8. In an electric clock, a hollow housing open at one end, an assembly comprising a transparent cover member secured to the open end of the hollow housing and having time indicia thereon, a first differential gear reducer in the housing and supported by the transparent cover member concentrically with a central axis and having an output member behind the transparent cover member, a second differential gear reducer in the housing and supported by the transparent cover member concentrically with the central axis and driven by the output member of the first differential gear reducer and having an output member behind the transparent cover member, said output member of the first differential gear reducer comprising an opaque disc of substantially the same diameter as the transparent cover member and having an indicating hand thereon behind and visible through the transparent cover member and cooperating with the time indicia on the transparent cover member for indicating time in minutes, and said output member of the second differential gear reducer being located between the transparent cover member and the output member of the first differential gear reducer and comprising a disc of less diameter than diameter of the output member of the first differential gear reducer and having an indicating hand thereon behind and visible through the transparent cover member and cooperating with the time indicia on the transparent cover member for indicating time in hours.

9. In an electric clock, a hollow housing open at one end, an assembly comprising a transparent cover member secured to the open end of the hollow housing and having time indicia thereon, a first differential gear reducer in the housing and supported by the transparent cover member concentrically with a central axis and having an output member behind the transparent cover member, a second differential gear reducer in the housing and supported by the transparent cover member concentrically with the central axis and driven by the output member of the first differential gear reducer and having an output member behind the transparent cover member, an indicating hand on the output member of the first differential gear reducer behind and visible through the transparent cover member and cooperating with the time indicia on the transparent cover member for indicating time in minutes, and an indicating hand on the output member of the second differential gear reducer behind and visible through the transparent cover member and cooperating with the time indicia on the transparent cover member for indicating time in hours, and means supported by the housing for manually manipulating the first differential gear reducer and hence the second differential gear reducer for manually setting the time indications of the electric clock.

10. In an electric clock, a hollow housing open at one end, an assembly comprising a transparent cover member secured to the open end of the hollow housing and having time indicia thereon, a first differential gear reducer in the housing and supported by the transparent cover member concentrically with a central axis and having an output member behind the transparent cover member, a second differential gear reducer in the housing and supported by the transparent cover member concentrically with the central axis and driven by the output member of the first differential gear reducer and having an output member behind the transparent cover member, said output member of the first differential gear reducer comprising an opaque disc of substantially the same diameter as the transparent cover member and having an indicating hand thereon behind the visible through the transparent cover member and cooperating with the time indicia on the transparent cover member for indicating time in minutes, and said output member of the second differential gear reducer being located between the transparent cover member and the output member of the first differential gear reducer and comprising a disc of less diameter than diameter of the output member of the first differential gear reducer and having an indicating hand thereon behind and visible through the transparent cover member and cooperating with the time indicia on the transparent cover member for indicating time in hours, and means supported by the housing for manually manipulating the first differential gear reducer and hence the second differential gear reducer for manually setting the time indications of the electric clock.

11. In an electric clock, a hollow housing open at one end and having a toothed annulus therein, an assembly including a transparent cover member secured to the open end of the hollow housing and having time indicia thereon, a first differential gear reducer in the housing having a driving eccentric rotatable about a central axis concentric with the toothed annulus, a rotor rotatably mounted on the eccentric and having a first ring of teeth meshing with the toothed annulus and a second ring of teeth, and a gear member rotatable about said central axis and meshing with the second ring of teeth on the rotor, a second differential gear reducer in the housing having an eccentric carried by the gear member for rotation about said central axis, a toothed rotor rotatably mounted on the eccentric, and a toothed annulus on the transparent cover member concentric with said central axis and meshing with the toothed rotor, means for rotatably supporting the driving eccentric and the gear member and eccentric on the transparent cover member, an indicating hand on the gear member of the first differential gear reducer behind and visible through the transparent cover member and cooperating with the time indicia on the transparent cover member for indicating time in minutes, and an indicating hand on the toothed rotor of the second differential gear reducer behind and visible through the transparent cover member and cooperating with the time indicia on the transparent cover member for indicating time in hours.

12. In an electric clock, a hollow housing open at one end and having a toothed annulus therein, an assembly including a transparent cover member secured to the open end of the hollow housing and having time indicia thereon, a first differential gear reducer in the housing having a driving eccentric rotatable about a central axis concentric with the toothed annulus, a rotor rotatably mounted on the eccentric and having a first ring of teeth meshing with the toothed annulus and a second ring of teeth, and a gear member rotatable about said central axis and meshing with the second ring of teeth on the rotor, a second differential gear reducer in the housing having an eccentric carried by the gear member for rotation about said central axis, a toothed rotor rotatably mounted on the eccentric, and a toothed annulus on the transparent cover member concentric with said central axis and meshing with the toothed rotor, means for rotatably supporting the driving eccentric and the gear member and eccentric on the transparent cover member including a pin secured to the transparent cover member and extending along said central axis on which the driving eccentric and the gear member and eccentric are rotatably mounted and by which the driving eccentric, rotor, gear member and eccentric, toothed rotor and transparent cover member are held in assembled relation, an indicating hand on the gear member of the first differential gear reducer behind and visible through the transparent cover member and cooperating with the time indicia on the transparent cover member for indicating time in minutes, and an indicating hand on the toothed rotor of the second differential gear reducer behind and visible through the transparent cover member and cooperating with the time indicia on the transparent cover member for indicating time in hours.

13. In an electric clock, a hollow housing open at one end and having a toothed annulus therein, an assembly including a transparent cover member secured to the open end of the hollow housing and having time indicia thereon, a first differential gear reducer in the housing having a driving eccentric rotatable about a central axis concentric with the toothed annulus, a rotor rotatably mounted on the eccentric and having a first ring of teeth meshing with the toothed annulus and a second ring of teeth, and a gear member rotatable about said central axis and meshing with the second ring of teeth on the rotor, a second differential gear reducer in the housing having an eccentric carried by the gear member for rotation about said central axis, a toothed rotor rotatably mounted on the eccentric, and a toothed annulus on the transparent cover member concentric with said central axis and meshing with the toothed rotor, means for rotatably supporting the driving eccentric and the gear member and eccentric on the transparent cover member, an indicating hand on the gear member of the first differential gear reducer behind and visible through the transparent cover member and cooperating with the time indicia on the transparent cover member for indicating time in minutes, and an indicating hand on the toothed rotor of the second differential gear reducer behind and visible through the transparent cover member and cooperating with the time indicia on the transparent cover member for indicating time in hours, and means supported by the housing for manually rotatably positioning the first mentioned toothed annulus for manually manipulating the first differential gear reducer and hence the second differential gear reducer for manually setting the time indications of the electric clock.

14. In an electric clock, a hollow housing open at one end and having a toothed annulus therein, an assembly including a transparent cover member secured to the open end of the hollow housing and having time indicia thereon, a first differential gear reducer in the housing having a driving eccentric rotatable about a central axis concentric with the toothed annulus, a rotor rotatably mounted on the eccentric and having a first ring of teeth meshing with the toothed annulus and a second ring of teeth, and a gear member rotatable about said central axis and meshing with the second ring of teeth on the rotor, a second differential gear reducer in the housing having an eccentric carried by the gear member for rotation about said central axis, a toothed rotor rotatably mounted on the eccentric, and a toothed annulus on the transparent cover member concentric with said central axis and meshing with the toothed rotor, means for rotatably supporting the driving eccentric and the gear member and eccentric on the transparent cover member, said gear member of the first differential gear reducer having an opaque disc portion of substantially the same diameter as the transparent cover member and having an indicating hand thereon behind and visible through the transparent cover member and cooperating with the time indicia on the transparent cover member for indicating time in minutes, and said toothed rotor of the second differential gear reducer being located between the transparent cover member and the gear member of the first differential gear reducer and being of less diameter than the diameter of the disc portion of the gear member and having an indicating hand thereon behind and visible through the transparent cover member and cooperating with the time indicia on the transparent cover member for indicating time in hours.

References Cited in the file of this patent

UNITED STATES PATENTS

| | | |
|---|---|---|
| 1,841,750 | Matthiessen | Jan. 19, 1932 |
| 1,887,479 | Bulova | Nov. 8, 1932 |
| 2,303,365 | Karlsen | Dec. 1, 1942 |
| 2,700,272 | Trichel | Jan. 25, 1955 |
| 2,821,063 | Sundt | Jan. 28, 1958 |

FOREIGN PATENTS

| | | |
|---|---|---|
| 479,376 | France | Dec. 24, 1915 |